United States Patent [19]
McIntosh

[11] Patent Number: 5,601,892
[45] Date of Patent: Feb. 11, 1997

[54] HOLLOW RODS WITH NICKEL COATED GRAPHITE FIBERS

[75] Inventor: James D. McIntosh, Hackettstown, N.J.

[73] Assignee: Abu AB, Svangsta, Sweden

[21] Appl. No.: 504,024

[22] Filed: Jul. 19, 1995

[51] Int. Cl.[6] .................................................. B29D 22/00
[52] U.S. Cl. ...................... 428/35.8; 428/36.3; 428/36.9; 428/36.91
[58] Field of Search .................. 428/35.8, 36.3, 428/36.9, 36.91

[56] References Cited

U.S. PATENT DOCUMENTS

| | | | |
|---|---|---|---|
| 4,481,249 | 11/1984 | Ebneth et al. | 428/288 |
| 4,737,527 | 4/1988 | Maranci | 523/205 |
| 4,882,370 | 11/1989 | Jordan et al. | 523/215 |
| 4,885,865 | 12/1989 | Rumbaugh | 43/18.5 |
| 5,362,580 | 11/1994 | Ferrando et al. | 429/245 |
| 5,385,195 | 1/1995 | Bell et al. | 164/66.1 |

OTHER PUBLICATIONS

INCO, Nickel Coating Facility, Oct. 10, 1994.
24th Int'l Sampe Tech Conf., Oct. 20, 1992.

*Primary Examiner*—Christopher Raimund
*Attorney, Agent, or Firm*—Banner & Witcoff, Ltd.

[57] ABSTRACT

Hollow rods are formed with at least one inner ply of graphite fibers in a first thermoset resin matrix and at least one outer ply of nickel-coated graphite fibers in a second thermoset resin. An outermost protective ply may be added to protect the integrity of the nickel-coated graphite fibers through the finish grinding steps. The nickel-coated graphite fibers impart increased impact strength to the final structure and serve to protect the inner graphite fiber layer(s) by preventing crack propagation that would lead to failure of the composite. The rods may be formed into suitable shapes for fishing rods, golf shafts, and arrow shafts.

11 Claims, 1 Drawing Sheet

HOLLOW RODS WITH NICKEL COATED GRAPHITE FIBERS

FIELD OF THE INVENTION

The invention relates to a hollow rod and method of manufacture thereof which includes nickel-coated graphite fibers for enhanced impact strength.

BACKGROUND OF THE INVENTION

The production of fiber-reinforced hollow rods from graphite fibers conventionally involves the steps of forming the fibers into a sheet-like prepreg, cutting the sheet stock to the appropriate pattern for the ultimate product, wrapping the prepreg around a mandrel (whether or not tapered), curing the epoxy, and removing the mandrel to form the product. Several layers or plies of wrapped prepreg can be used. The number and orientation of the fibers within the plies, both relative to each other and with respect to the longitudinal axis of the mandrel, can be varied to modify characteristics of the rod. Significant investments in time, capital, and training are made in the commercial manufacture of such articles. Such investments are not readily changed or discarded. In the face of such resistance, it is desirable that any improvements in the strength of the manufactured article be performed in a manner that does not significantly change the techniques used to make such conventional hollow rod articles.

The impact strength of hollow rod articles is important, particularly when such rods are used as components in sporting goods where longitudinal impact, flexing, and shear forces (intended or accidental) are experienced. Higher impact strengths increase the useful lifetime of the product and, in some instances, enhance its performance spectrum.

Graphite fibers represented a significant advance in the art both in terms of weight savings, flex, and strength for hollow rods used in sporting goods. Unfortunately, graphite fishing rods still get slammed in car doors, graphite composite golf shafts do still break (usually at the hosel connection), and arrow shafts do snap. It would be desirable to have a way to increase the impact strength of hollow rod articles, such as fishing rods, golf shafts, and arrow shafts made from graphite composites.

Recently, nickel-coated graphite fibers have been become available that exhibit a higher impact strength relative to conventional graphite fibers. Those in the electronics and battery industries have used such fibers as shielding, as electrically conductive members, and as an electrode. The aircraft industry has investigated use of the fibers as structural components for the increased impact strength without significant addition of weight.

Nickel-coated graphite fibers are significantly more expensive than conventional graphite fibers. Prices for the nickel-coated fibers are at least twice that of graphite. It would be desirable to have a way to make use of the higher impact strength of coated graphite fibers for hollow rod products without incurring the significant additional expense of using only the nickel-coated fibers in the composite.

SUMMARY OF THE INVENTION

It is an objective of the invention to provide hollow rod articles and a method of masking them that increase the impact strength of the resulting product without significantly altering the conventional techniques for their manufacture.

It is another objective of the invention to provide a hollow rod composite and method of manufacture thereof that makes economical use of the advantages of nickel-coated graphite fibers.

In accordance with this and other objectives of the invention that will become apparent from the description here, hollow rods according to the invention comprise: a hollow, rod having a flexible, resilient body of a generally circular exterior cross section from a tip end to a butt end along an axis, wherein said body comprises a multiply construction comprising at least one inner ply of graphite fibers in a first thermoset resin matrix and at least one outer ply of nickel-coated graphite fiber in a second thermoset resin matrix.

By using the nickel-coated graphite fibers as an outer ply or plies and conventional graphite fibers as inner plies, the enhanced impact strength of these fibers can be exploited while preserving the cost effectiveness of the product. The nickel-coated fibers are used at the critical outer ply or plies where they are able to provide the maximum benefits and resist crack propagation at high shear regions (such as the hosel connection of a golf shaft) or where the wall thickness is thin (such as the tip of a fishing rod).

DETAILED DESCRIPTION

Figure 1:
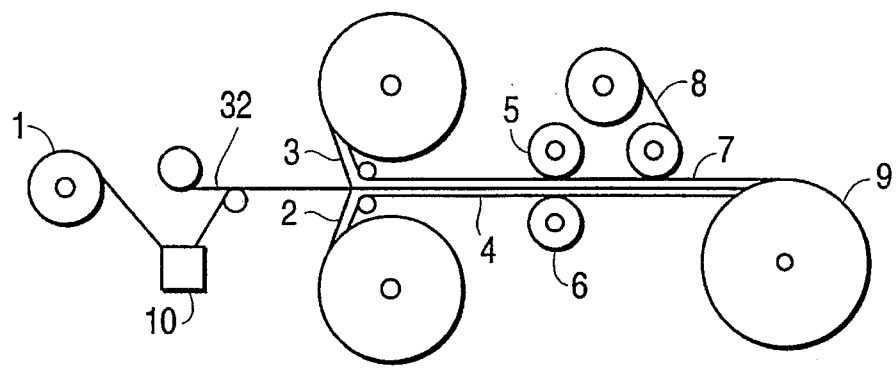
FIG. 1 is a diagram showing the manufacture of prepreg sheet stock.

Hollow rods made according to the invention exhibit a multi-ply construction containing at least one inner ply of graphite in a first thermoset resin matrix, at least one outer ply of nickel-coated graphite fibers in a second thermoset resin matrix, and an optional outermost protective ply to protect the integrity of the nickel-coated fibers through the finish grinding steps. By such a construction, the rod structures made therefrom maximize the enhanced impact strength of nickel coated graphite fibers where the wall diameter is thin (as in fishing rod tips) or where the rod is restrained from responding to impact forces by full flexural motion (as in the hosel connection between a golf shaft and a club head). Using a limited number of nickel-coated graphite plies as outer plies of the rod structure protects the inner plies of graphite fibers by eliminating crack propagation before the structural integrity of the rod is compromised.

The coated and uncoated graphite fibers used to make the present composites may exhibit the same or different physical characteristics. Preferred carbon fibers have a carbon content above 80% by weight.

Nickel coated graphite fibers can be made in a number of processes. Exemplary processes include deposition by electrodeposition, sputter coating, plasma deposition, and solvent-based methods. The preferred process for depositing nickel on graphite fibers involves the decomposition of nickel carbonyl gas on heated graphite fibers.

Nickel carbonyl, $Ni(CO)_4$, is a colorless, volatile, toxic, flammable, mobile liquid with a characteristic odor. It has a molecular weight of 170.75, a specific gravity of 1.32, a melting point of −25° C., and a boiling point of 43° C. The Merck Index 10th ed., states that nickel carbonyl "[o]xidizes in air: explodes at 60° C." Nickel carbonyl is also very toxic having a maximum allowable concentration in air of 0.001 parts per million. For these reasons, extreme care and special equipment is required to confine the nickel carbonyl in this process.

The nickel plating step comprises exposing a heated graphite fiber to nickel carbonyl vapor in a confined space free of air. When the vapor comes in contact with the heated graphite, the nickel carbonyl decomposes, deposits nickel metal on the surface of the graphite, and releases carbon monoxide. The preferred method involves the deposition of a layer of nickel having a thickness within the range of about 0.05–20 μm, preferably 0.1–2 μm. The nickel coating deposited on the graphite fibers by such a current-free, organic method does not pose problems with the chemical compatibility of most conventionally used thermoset resins.

Suitable nickel coated fibers are available from Inco Speciality Powder Products, Wyckoff, N.J. 07481 USA as VAPORFAB™ Nickel Coated Fiber. Such fibers are commercially available in spools suitable for integration into a conventional prepreg manufacturing facility.

The thermoset resins used for the present invention are those conventionally used for hollow rods made with graphite composite prepregs. See, U.S. Pat. No. 4,778,716 which is herein incorporated by reference. In general, the resins used for fishing rods represents about 40–70% of the rod weight and is formulated to provide a fairly high degree of flex. Golf shafts, on the other hand, have a somewhat lower resin content and exhibit much less flex. Arrow shafts have little flex and are intended to be fairly rigid, lightweight rods. The resin systems used to make each of these articles is well known to those with an existing level of skill in the art and are useful in the present invention.

Thermoset resins made of epoxy are generally preferred. Especially preferred epoxies are those having more than one functional group in the molecule. The matrix of the present invention is prepared by mixing a polyfunctional epoxide compound or compounds (prepolymer or prepolymers) with a suitable curing agent, such as an amine-functional, and preferably polyfunctional curing agent. Conventional ratios can be used, for example, 1 epoxide equivalent to 0.3 to 3.0 NH-equivalents, preferable 1.0 to 3.0 NH-equivalents, and especially preferably 1.5 to 2.5 HN-equivalents, optionally with heating.

The epoxy prepolymers include, but are not limited to, polyglycidyl ethers of polyvalent phenols, for example, pyrocathechol; resorcinol; hydroquinone; 4,4'-dihydroxy-3, 3'-dimethyldiphenyl methane; 4,4'-dihydroxydiphenyl dimethyl methane; 4,4'-dihydroxydiphenyl methyl methane; 4,4'-dihydroxydiphenyl cyclohexane; 4,4'-dihydroxy-3,3'-dimethyldiphenyl propane; 4,4'-dihydroxydiphenyl sulphone; or tris-(4-hydroxyphenyl)methane; polyglycidyl ethers of the chlorination and bromination products of the above-mentioned diphenols; polyglycidyl ethers of novolacs (i.e., reaction products of monohydric or polyhydric phenols with aldehydes, formaldehyde in particular, in the presence of acid catalysts); polyglycidyl ethers of diphenols obtained by esterifying 2 mols of the sodium salt of an aromatic hydroxycarboxylic acid with 1 mol of a dihalogen alkane or dihalogen dialkyl ether (See U.K. Pat. No. 1,107,612); and polyglycidyl ethers of polyphenols obtained by condensing phenols and long-chain halogen paraffins containing at least 2 halogen atoms (See U.K. Pat. No. 1,024,288).

Other suitable compounds include polyepoxy compounds based on aromatic amines and epichlorohydrin, for example, N,N'-diglycidyl-aniline; N,N'-dimethyl-N,N'-diglycidyl-4, 4'-diaminodiphenyl methane; N,N,N',N '-tetraglycidyl-4,4-diaminodiphenyl methane; and N-diglycidyl-4-aminophenyl glycidyl ether. Special mention is made of N,N,N',N'-tetraglycidyl-1,3-propylene bis-4-aminobenzoate.

Glycidyl esters and/or epoxycyclohexyl esters of aromatic, aliphatic and cycloaliphatic polycarboxylic acids, for example, phthalic acid diglycidyl ester and adipic ester diglydicyl and glydicyl esters of reaction products of 1 mol of an aromatic or cycloaliphatic dicarboxylic acid anhydride and ½ mol of a diol or 1/n mol of a polyol with n hydroxyl groups, or hexahydrophthalic acid diglycidyl esters, optionally substituted by methyl groups, are also suitable.

Glycidyl ethers of polyhydric alcohols, for example, of 1,4-butanediol; 1,4-butenediol; glycerol; 1,1,1-trimethylol propane; pentaerythritol and polyethylene glycols may also be used. Triglycidyl isocyanurate; and polyglycidyl thioethers of polyvalent thiols, for example of bis mercaptomethylbenzene; and diglycidyltrimethylene sulphone, are also suitable as well as virtually any other thermoset resin system that will form a good bond with graphite and nickel-coated graphite fibers.

The strength of the final composite will depend, in large part, on the strength of the bond between the resin matrix and the graphite fibers, whether or not they are nickel coated. The fibers are preferably provided with a surface coating, coupling agent, or sizing that enhances the wetting action and bond quality between the resin and the fiber surfaces. Suitable coupling agents include 1–5 wt % of a silane, a titanam, an aluminate, a zirconate, a zircoaluminate, an amino silane, epoxyalkyltrialkoxysilane, and epoxy resin precursors or thermoplasts (e.g., polyarylsulphone). One particularly preferred coating or "sizing" that enhances this bond is an aqueous solution containing 0.1–3%, preferably 0.5–1.5%, of an epoxy that is compatible with or the same as the resin matrix that will be used in the prepreg.

In the prepreg operation of the invention, multiple spools of sized graphite fibers are fed in parallel sheet form, coated with a thin layer (about 0.05–0.2 mm) of a thermoset resin, and formed into prepreg sheet stock that can be rolled and stored for later use. In a preferred form, the graphite fibers are continuously fed between sheets of epoxy continuously feeding from a roll. A paper carrier is generally used to facilitate the support and handling of the individual epoxy sheets. A pair of nip rollers then apply pressure to the sandwich composite to transfer the epoxy to the fibers and bond the epoxy layers together. One of the two paper layers is removed, and the prepreg sheet stock is wound onto a spool.

The hollow rods of the invention can be made into fishing rods, golf shafts, arrow shafts, and any other product that requires a flexible, resilient body exhibiting a generally circular exterior cross section. Such products are made by wrapping fiber-containing prepreg patterns around a mandrel of a specific taper (or lack thereof) to form a multiply construction. The pattern and orientation of the fibers within each pattern can be modified to achieve desired performance characteristics including hoop strength, tension and compressive strength, and flex. For fishing rods, see U.S. Pat. Nos. 4,885,865 and 5,338,604 the disclosures of which are herein incorporated by reference.

Golf shafts, fishing rods, and arrow shafts can be made according to the invention with slight modification of standard prepreg patterns, mandrels, layup, and curing conditions known to those with no more than an ordinary level of skill in each of those respective manufacturing technologies. Each generally involves cutting prepregs to shape, wrapping the prepregs onto a mandrel until a sufficient number of plies or layers has been built up to form the desired product, covering the wrapped mandrel with a shrinkable tape or film, hanging the shrinkwrap covered mandrel in a curing oven until the resin matrix is cured, removing the shrinkwrap layer, pulling out the mandrel, and finishing the surface of the hollow rod. Many of these steps are performed with automated machinery.

In the present invention, the rod exhibits a multilayered structure with at least one inner ply of conventional graphite fibers and at least one outer ply of nickel-coated graphite fibers. A ply of glass fibers (called a "scrim") is wound circumferentially to enhance hoop strength and can be used as the outermost ply, between the nickel-coated and conventional graphite plies, or between nickel coated graphite plies when two such plies are used.

Scrim is available with a number of different characteristics. The preferred scrim has a weight within the range from about 20–25 g/m$^2$ and with either a balanced weave or where one direction uses heavier fibers or fiber count than another. Scrim is typically incorporated by co-feeding it with the fibers into the prepreg.

The outer ply or plies of nickel-coated graphite fibers are oriented so their fibers are substantially parallel to the rod axis, i.e., at an angle within the range of 0–15 degrees, preferably parallel (0 degrees), relative to the axis of the rod. This orientation enhances the impact strength of the rod and protects the inner layers of conventional graphite from failure. Such a structure maximizes the enhanced impact strength of nickel-coated graphite fibers while avoiding the added expense of making the rod from only nickel-coated graphite fibers.

If desired, the rods may be provided with an outermost protective layer to protect the integrity of the nickel-coated fibers during the conventional finish grinding steps. Such outermost protective layers can be made with a ply of conventional graphite fibers or glass fibers.

The present invention is conveniently described with reference to the attached figures. In FIG. 1, spools 1 of graphite fibers are passed through sizing unit 10 to coat the fibers with a sizing agent that will enhance the bond between the fibers and the resinous matrix. Sized fibers are then passed in parallel into contact with thermoset resin layers 2 and 3. Scrim 32 can be fed into the prepreg in parallel with the fibers. The graphite fibers used to make the composite may be made of nickel-free fibers for the inner layer or layers and of nickel-coated fibers for the outer 1–2 plies of prepreg. Alternatively, a plurality of spools 1 may be replaced with a single spool 1 of a woven graphite fiber mat for the inner ply or plies.

Each of layers 2 and 3 is made of a thin layer of thermoset resin on a carrier material, usually a coated paper. The three layer sandwich composite 4 is passed between nip rollers 5 and 6 whereby pressure is applied to composite 4 to bond thermoset resin layers 2 and 3 to the sized fibers and form prepreg 7. One of the two carrier materials 8 is then peeled from prepreg 7 which is then wound onto spool 9.

Figure 2:
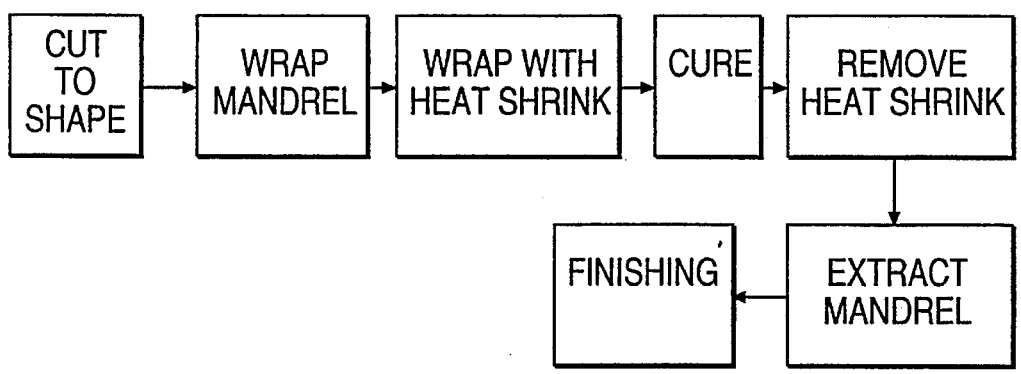
FIG. 2 is a block diagram depicting the steps used to make multi-ply hollow rods.

FIG. 2 is a block diagram showing the sequence of steps used to make hollow rods according to the invention. The patterns used in forming the hollow rods are cut from the prepeg sheet stock in size, shape, and fiber orientation appropriate to the desired product blank and wrapped on a mandrel shaped appropriate to the final hollow rod product. Fishing rods and golf shafts will exhibit a taper from the butt end (largest diameter) to the tip end. Arrow shafts are not significantly tapered and exhibit a roughly constant outer diameter from tip to butt.

Figure 3:
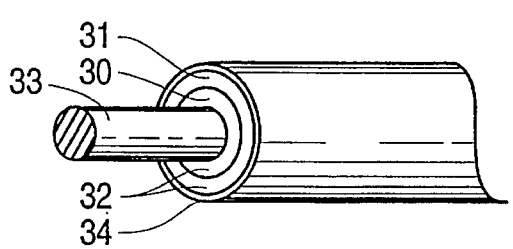
FIG. 3 illustrates the cross sectional structure of a multi-ply rod with an inner ply of graphite fiber and an outer ply of nickel-coated graphite fiber.

The first step in composite rod manufacture is to cut the prepreg to shape. According to the invention and with reference to FIG. 3, hollow rods in the shape of golf shafts, fishing rods, and arrow shafts have at least one inner ply 30, preferably 1–4 plies of a graphite fiber in a first thermoset resin matrix wrapped around mandrel 33 and at least one outer ply 31, preferably 1–2 plies, of a nickel-coated graphite in a second thermoset resin matrix. Golf shafts will tend to use inner plies at an angle of about 30–60 degrees relative to the axis of mandrel 33. Fishing rods tend to employ fibers disposed longitudinally along the mandrel axis. Each ply is wrapped sequentially so that one continues where the previous ply ended. Suitable patterns for use in forming fishing rods are cut in generally right triangular patterns so that the thickness of the composite remains substantially constant from tip end to butt end.

Scrim ply 32 is very light (20–25 g/m$^2$) and is made of circumferentially woven glass fibers. Scrim 32 may be used anywhere in the rod structure to provide hoop strength. It is preferred that scrim ply 32 be formed into each prepreg by co-feeding scrim with the fibers.

Figure 4:
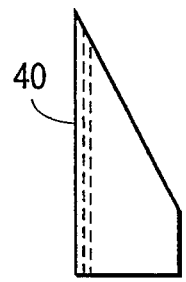
FIGS. 4 and 5 depict two prepreg pattern shapes that can be used to make fishing rods with the outermost fiber layers aligned substantially parallel to the axis of the fishing rod.
Figure 5:
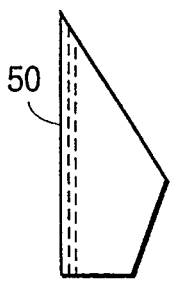

For fishing rods, the ply or plies are conventionally cut so that the uncoated and nickel-coated graphite fibers are aligned with the longest side of the pattern. In FIGS. 4 and 5, the fibers would be aligned with sides 40 and 50, respectively, so that the fibers within the prepreg will become parallel to the axis of the fishing rod. Because the specific prepreg pattern will differ depending on whether the rod will be made into a golf shaft (thicker at the tip than at the butt) or an arrow shaft and even among the patterns used by fishing rod manufacturers for different rod designs, those in the art will be able to determine from their own patterns how to cut the prepreg to align the outermost layer or layers of nickel-coated graphite fibers with the axis of the final product. The exterior fibers at the larger diameter end of the rod may be aligned at a slightly decreased angle to the axis of the rod, due to the manner in which the pattern or patterns are rolled around the tapered mandrel, but the fibers are all generally longitudinally aligned to the axis of the rod, and essentially all of the fibers generally extend the length of the rod.

A protective outermost ply 34 can be used to provide protection for the outer ply or plies 31 through the finish grinding steps. The finish grinding steps remove the shrink wrap patterns from the outer surface of the rod and could damage the continuity of the nickel-coated graphite fibers which would adversely affect the impact strength of the rod. Such a protective layer may be made with a ply of conventional graphite fibers or glass fibers.

It is preferred that fishing rods will be made with 2–4 inner plies of graphite fibers in an epoxy matrix, and 1–2 outer plies of nickel-coated graphite in the same epoxy matrix. Scrim is preferably used in each ply.

After the mandrel has been wrapped with the appropriate number of prepreg plies, an overlapping layer of a shrink wrap film in tape or sheet form is wrapped around the multi-ply assembly on the mandrel. A wrap density for heat shrink tape is conventionally about 2 revolutions per inch of mandrel length. As the rod is subjected to elevated curing temperatures, the heat shrink wrapping exerts a uniformly compressive force that forms a unified composite body from the plurality of individual plies. Curing generally involves heating the wrapped mandrel from room temperature to about 165°–175° F., maintaining that temperature for about 45–75 minutes, raising the temperature to within the range from about 200°–300° F., and maintaining the higher temperature for about 45–75 minutes. The two curing temperatures can be attained at a heating elevation rate of 1°–10° F./minute.

After the curing process, a few remaining steps are left. The heat shrink overwrap is removed, the mandrel is extracted, and the final finishing of the rod blank is completed. Generally, the final finish grinding is performed on a cernterless grinder to remove any ridges or lines caused by the shrinkwrap.

EXAMPLE

The top three foot section of two fishing rod blanks were tested for impact strength. One blank was made with five graphite fiber plies. The second was made with three inner plies of graphite and two outer plies of nickel-coated graphite fiber plies. The same number of plies, wall thicknesses, and resin system was used in each sample.

The impact resistance of each blank was measured by denting the surface of each blank with equal force at the same position and measuring the flexural load that was required to break the rod. Such conditions are intended to simulate in the laboratory the accidental damage that occurs during actual fishing conditions as the rod tip strikes a hard edge (e.g., the boat gunnel, a seat edge, a hard tackle box, a motor housing, etc.).

In samples of the invention, impact strength was increased by about 40%.

I claim:

1. A hollow, rod having a flexible, resilient body of a generally circular exterior cross section from a tip end to a butt end along an axis, wherein said body comprises a multi-ply construction comprising at least one inner ply of graphite fibers in a first thermoset resin matrix and at least one outer ply of nickel-coated graphite fibers in a second thermoset resin matrix.

2. A hollow rod as in claim 1 wherein said at least one outer ply further contains glass fibers and has nickel-coated graphite fibers aligned substantially parallel to the rod axis.

3. A hollow rod as in claim 1 exhibiting the shape of a fishing rod.

4. A hollow rod as in claim 1 exhibiting the shape of a golf shaft.

5. A hollow rod as in claim 1 exhibiting the shape of an arrow shaft.

6. A hollow rod as in claim 1 wherein said first thermoset resin is the same as said second thermoset resin.

7. A hollow rod as in claim 1 wherein said rod exhibits the shape of a fishing rod and has 4–6 inner plies of graphite fibers, 1–2 outer plies of nickel-coated graphite fibers, and scrim between each ply.

8. A hollow rod as in claim 1 further comprising an outermost protective layer wrapped over said at least one outer ply.

9. A hollow rod as in claim 8 wherein said protective layer comprises graphite fibers.

10. A hollow rod as in claim 8 wherein said protective layer comprises glass fibers.

11. A hollow rod as in claim 1 wherein fibers in said at least one inner ply and said at least one outer ply are bonded to said first thermoset resin and said second thermoset resin, respectively, by a dilute solution of epoxy coated onto said fibers before contact with the first or second resin.

* * * * *